United States Patent
Zhang et al.

(10) Patent No.: US 12,351,521 B2
(45) Date of Patent: Jul. 8, 2025

(54) SILICON NITRIDE CERAMIC MATERIAL FOR MOBILE PHONE REAR COVER AND PREPARATION METHOD THEREFOR

(71) Applicant: SHANGHAI INSTITUTE OF CERAMICS, CHINESE ACADEMY OF SCIENCES, Shanghai (CN)

(72) Inventors: Jingxian Zhang, Shanghai (CN); Yusen Duan, Shanghai (CN); Ning Liu, Shanghai (CN); Ruixin Ma, Shanghai (CN); Dongliang Jiang, Shanghai (CN)

(73) Assignee: SHANGHAI INSTITUTE OF CERAMICS, CHINESE ACADEMY OF SCIENCES, Shanghai (CN)

( * ) Notice: Subject to any disclaimer, the term of this patent is extended or adjusted under 35 U.S.C. 154(b) by 903 days.

(21) Appl. No.: 17/275,148

(22) PCT Filed: Aug. 30, 2019

(86) PCT No.: PCT/CN2019/103757
§ 371 (c)(1),
(2) Date: Mar. 10, 2021

(87) PCT Pub. No.: WO2020/052453
PCT Pub. Date: Mar. 19, 2020

(65) Prior Publication Data
US 2022/0041512 A1     Feb. 10, 2022

(30) Foreign Application Priority Data
Sep. 11, 2018 (CN) .................. 201811057057.X (51) Int. Cl.
C04B 35/591     (2006.01)
C04B 35/626     (2006.01)
(Continued)

(52) U.S. Cl.
CPC ........ *C04B 35/591* (2013.01); *C04B 35/6342* (2013.01); *H04M 1/026* (2013.01);
(Continued)

(58) Field of Classification Search
CPC .............. C04B 35/591; C04B 35/6342; C04B 35/6261; C04B 2235/3217;
(Continued)

(56) References Cited

FOREIGN PATENT DOCUMENTS

| CN | 103951420 A | 7/2014 |
| CN | 104446457 A | 3/2015 |

(Continued)

OTHER PUBLICATIONS

KR20170135105A machine translation (Year: 2016).*
(Continued)

*Primary Examiner* — Sally A Merkling
*Assistant Examiner* — Logan Edward Laclair
(74) *Attorney, Agent, or Firm* — Alleman Hall & Tuttle LLP (57) ABSTRACT

A silicon nitride ceramic material for a mobile phone rear cover and a preparation method therefor. The method comprises: using a mixture of a silicon source, a colorant, and a sintering aid as raw materials, mixing the raw material components, and performing shaping and sintering to obtain the silicon nitride ceramic material. The toughness of the silicon nitride ceramic material can reach more than 12 MPa·m$^{1/2}$; the thermal conductivity thereof can reach 40 to 70 W/m·K; and a dielectric loss thereof is $10^{-4}$.

8 Claims, 4 Drawing Sheets

(51) Int. Cl.
*C04B 35/634* (2006.01)
*H04M 1/02* (2006.01)

(52) U.S. Cl.
CPC .. *C04B 35/6261* (2013.01); *C04B 2235/3217* (2013.01); *C04B 2235/3225* (2013.01); *C04B 2235/3241* (2013.01); *C04B 2235/6586* (2013.01); *C04B 2235/77* (2013.01); *C04B 2235/9607* (2013.01)

(58) Field of Classification Search
CPC .... C04B 2235/3225; C04B 2235/3241; C04B 2235/6586; C04B 2235/77; C04B 2235/9607; C04B 35/486; C04B 35/632; C04B 2235/3224; C04B 2235/3244; C04B 2235/428; C04B 2235/6025; C04B 2235/6567; C04B 2235/661; C04B 35/584; C04B 2235/6562; C04B 35/6264; C04B 2235/3873; C04B 2235/95; C04B 2235/96; C04B 2235/9661; C04B 35/622; H04M 1/026; H04M 1/0283; H04M 1/0202

See application file for complete search history.

(56) References Cited

FOREIGN PATENT DOCUMENTS

| JP | 06172034 A | * | 6/1994 |
| KR | 20170135105 A | * | 5/2016 |

OTHER PUBLICATIONS

JP-06172034-A machine translation (Year: 1994).*
Bitterlich et al (Aqueous tape casting of silicon nitride, Journal of the European Ceramic Society, 2002) (Year: 2002).*

* cited by examiner

TABLE 1

| Example | Silicon source Raw materials | Mass (g) | Colorant Raw materials | Mass (g) | Sintering aid Raw materials | Mass (g) | Organic solvent Raw materials | Mass (g) | Dispersant Raw materials | Mass (g) | Binder Raw materials | Mass (g) | Plasticizer Raw materials | Mass (g) |
|---|---|---|---|---|---|---|---|---|---|---|---|---|---|---|
| 1 | Silicon nitride | 160 | Chromic oxide | 2 | Alumina and yttrium oxide (3:5) | 15 | Ethanol/butanone (34:66) | 38 | Glycerol trioleate | 3.5 | PVB | 16 | DBP | 16 |
| 2 | Silicon powder | 96 | Chromic oxide | 2 | Alumina and yttrium oxide (3:5) | 15 | Ethanol/butanone (34:66) | 38 | Glycerol trioleate | 3.5 | PVB | 16 | DBP | 16 |
| 3 | Silicon nitride | 160 | --- | --- | Alumina and erbium oxide (3:6) | 16 | Ethanol/butanone (34:66) | 38 | Glycerol trioleate | 3.5 | PVB | 16 | DBP | 16 |
| 4 | Silicon powder | 96 | Chromic oxide | 2 | Alumina and erbium oxide (3:6) | 16 | Ethanol/butanone (34:66) | 38 | Glycerol trioleate | 3.5 | PVB | 16 | DBP | 16 |
| 5 | Silicon nitride | 160 | --- | --- | Alumina and europium oxide (2:5) | 16 | Ethanol/butanone (34:66) | 38 | Glycerol trioleate | 3.5 | PVB | 16 | DBP | 16 |
| 6 | Silicon nitride | 160 | --- | --- | Alumina and europium oxide (2:5) | 15 | n-Hexane | 38 | Terpineol | 3.5 | PMMA | 16 | DBP | 16 |
| 7 | Silicon nitride | 160 | Hafnium oxide | 2 | Alumina and yttrium oxide (3:5) | 15 | Ethanol/butanone (34:66) | 38 | Glycerol trioleate | 3.5 | PVB | 16 | DBP | 16 |
| 8 | Silicon nitride | 160 | Chromic oxide | 2 | Alumina and yttrium oxide (3:5) | 15 | Ethanol/butanone (34:66) | 38 | Glycerol trioleate | 3.5 | --- | --- | --- | --- |
| 9 | Zirconia | 160 | Chromic oxide | 1 | Yttrium oxide | 6 | Ethanol/butanone (34:66) | 38 | Glycerol trioleate | 3.5 | PVB | 15 | DBP | 15 |

FIG. 3

TABLE 2

| Example | Thickness (mm) | Heating rate (°C/min) | Nitriding temperature (°C) | Nitriding time (hour) | Sintering temperature (°C) | Sintering time (hour) |
|---|---|---|---|---|---|---|
| 1 | 0.6 | 5 | --- | --- | 1750 | 2 |
| 2 | 0.6 | 5 | 1400 | 8 | 1750 | 2 |
| 3 | 0.6 | 5 | --- | --- | 1780 | 6 |
| 4 | 0.6 | 5 | 1400 | 8 | 1780 | 8 |
| 5 | 0.6 | 5 | --- | --- | 1900 | 5 |
| 6 | 0.6 | 5 | --- | --- | 1900 | 5 |
| 7 | 0.6 | 5 | --- | --- | 1600 | 12 |
| 8 | --- | 5 | --- | --- | 1750 | 2 |
| 9 | 0.6 | 5 | --- | --- | 1600 | 2 |

FIG. 4

TABLE 3

| Example | Density (g/cm³) | Toughness (MPa·m^(1/2)) | Strength (MPa) | Thermal conductivity (W/m·K) | Dielectric constant | Dielectric loss (10⁻⁴) | Relative density (%) |
|---|---|---|---|---|---|---|---|
| 1 | 3.22 | 12 | 900 | 62 | 7.6 | 13 | 98.47 |
| 2 | 3.20 | 13 | 950 | 65 | 7.8 | 14 | 97.86 |
| 3 | 3.29 | 13 | 850 | 64 | 8.0 | 11 | 99.10 |
| 4 | 3.24 | 14 | 1,000 | 68 | 7.7 | 13 | 99.39 |
| 5 | 3.28 | 14 | 950 | 72 | 8.0 | 12 | 99.09 |
| 6 | 3.23 | 12 | 850 | 60 | 7.5 | 13 | 98.78 |
| 7 | 3.25 | 12 | 900 | 45 | 7.8 | 10 | 99.09 |
| 8 | 3.18 | 12 | 800 | 60 | 8.5 | 15 | 97.25 |
| 9 | 5.92 | 11.8 | 670 | 4.5 | 34 | 1,800 | 97.18 |

SILICON NITRIDE CERAMIC MATERIAL FOR MOBILE PHONE REAR COVER AND PREPARATION METHOD THEREFOR

TECHNICAL FIELD

The present application relates to a novel silicon nitride ceramic for a mobile phone rear cover and a preparation method thereof, which belongs to the field of ceramic materials and their preparation process and application.

BACKGROUND

With the rapid development of communication and digital technology, mobile phones and other electronic products have gone through several upgrades in just a few decades and have become an epitome of scientific and technological progress in different ages. A mobile phone case (rear cover) is not only a powerful protective umbrella for the mobile phone, but also ensures the reception and transmission of electromagnetic signals, reduces the damage from accidental drops, and extends the service life of the mobile phone, and more importantly, can enhance the user experience of mobile phone products. Therefore, the material for preparing a mobile phone case is required to have the characteristics of non-electromagnetic shielding, high toughness, color diversity, good texture, abrasion resistance, good thermal conductivity, stable size, beautiful appearance, etc., which also puts forward higher requirements for the material of a mobile phone rear cover.

At present, the mobile phone rear cover is mainly made of plastic, metal, glass, and ceramics. Metal may shield electromagnetic signals and is not applicable to the mobile phone rear cover; plastic has a high dielectric loss and cannot satisfy consumers' demands for mobile phone user experience and other high-end trends; glass is most commonly used for a back cover at present, while it is very fragile. The toughness, bending strength, hardness, abrasion resistance, heat dissipation, and other properties of a ceramic rear cover can meet the above requirements, so it can better adapt to the requirements of future mobile phone communication. Ceramic will be the main candidate material for the mobile phone rear cover in the 5G era. Ceramic such as zirconia can be used for preparing a mobile phone rear cover, but there are also some problems with zirconia. In the first place, zirconia ceramic has a poor impact toughness and tends to break during machining; moreover, based on that zirconia ceramic depends on phase transformation toughening to ensure a high toughness, subjecting the zirconia ceramic to frequent impacts is likely to cause microcrack propagation, thus reducing its application reliability. Secondly, zirconia ceramic has a low thermal conductivity, usually only about 5 W/m·K, which makes it difficult to dissipate heat, especially in the case of mobile phone software running at high speed and battery overheating, and thus poor heat dissipation tends to affect the running speed and reliability of the mobile phone. Thirdly, zirconia ceramic has a dielectric loss on $10^{-2}$ orders of magnitude, which may attenuate signals and lead to poor communication in areas with poor mobile phone signals. Fourthly, zirconia ceramic has a high density, resulting in an increase in the body weight of a cell phone. Fifthly, zirconia ceramic has a slightly lower hardness, leading to a risk of scratches on the zirconia ceramic rear cover.

SUMMARY

In view of the above-mentioned problems in the prior art as well as the application background and requirements of mobile phone rear cover, the present application proposes to use silicon nitride ceramic as the rear cover material of a communication device mobile phone, based upon long-term research and accumulation on the silicon nitride ceramic, so as to make up for the aforementioned shortcomings of current zirconia mobile phone rear cover materials. At present, there are no reports on such mobile phone rear cover materials at home and abroad.

In a first aspect, the present application provides a method for preparing a silicon nitride ceramic, wherein the method comprises: taking a mixture containing a silicon source, a colorant, and a sintering aid as raw materials, mixing each component of the raw materials, followed by shaping and sintering to obtain a silicon nitride ceramic. In some preferred examples, the method uses a mixture consisting of the silicon source, the colorant, and the sintering aid as raw materials.

In a second aspect, the present application provides a silicon nitride ceramic prepared by the method described in the first aspect thereof.

In a third aspect, the present application provides an application of silicon nitride ceramic as a mobile phone rear cover material; preferably, the silicon nitride ceramic is prepared by the method described in the first aspect of the present application, that is, the silicon nitride ceramic described in the second aspect of the present application.

In a fourth aspect, the present application provides a mobile phone rear cover, which is made of silicon nitride ceramic.

Advantageous Effect

Compared with prior art, the present application has the following technical effects:

(1) Good toughness and high strength. The toughness of the silicon nitride ceramic of the application can reach more than 12 MPa·m$^{1/2}$ and the strength can reach 500 MPa to 1,100 MPa, which can fully meet the required mechanical properties of a mobile phone rear cover material.

(2) Good impact toughness. The silicon nitride ceramic of the application belongs to whisker-toughened ceramics, has good impact resistance, can be conveniently machined but not easily broken, has little effect on material performance degradation due to microcrack propagation caused by machining, and is not likely to cause cracking in use even if under frequent impact.

(3) High thermal conductivity and excellent heat dissipation performance. The silicon nitride ceramic of the application has a high thermal conductivity, which can reach 40 to 70 w/m·K and is more than 10 times that of zirconia ceramic. The silicon nitride ceramic used as the material of a mobile phone case can dissipate heat more easily, and avoid system crashes and performance degradation caused by heat generated during the high-speed operation of a mobile phone.

(4) Low dielectric loss. The silicon nitride ceramic of the application has a dielectric loss usually on $10^{-4}$ orders of magnitude, better transparency for microwaves, a stronger ability to receive signals, a very small microwave signal attenuation, has advantages when the signal is weak, is an excellent microwave window material, and is conducive to unobstructed mobile phone signals.

(5) High hardness. The silicon nitride ceramic of the application has a high hardness and even can be used as a ceramic cutting tool material, which is not easily scratched; moreover, even if there is a microcrack, the crack is not easily expanded due to the special microstructure of the silicon nitride ceramic, and thus the application reliability of mobile phone rear cover can be guaranteed.

(6) Low density. The silicon nitride ceramic of the application can effectively reduce the body weight of mobile phone, and is particularly suitable for lightweight requirements.

(7) Good transparency, good texture, easy-to-color, and good coloring effect. The silicon nitride ceramic of the application belongs to transparent ceramics, is easy to be colored, can achieve a color diversification, has a good coloring effect, and a texture similar to jade, is a mobile phone rear cover material with great potential, and is suitable for a mobile phone case such as a medium and high-end mobile phone case.

(8) A simple, reliable and easy-to-operate preparation process, and a low cost of raw materials. Despite the fact that silicon nitride powder costs more than zirconia by weight, due to the low density of silicon nitride, the raw material cost of silicon nitride is equivalent to that of zirconia in preparing ceramic materials with the same volume.

All in all, from the point of view of various properties, silicon nitride ceramic as the material of a mobile phone rear cover, has more advantages than zirconia ceramic, and is more excellent and promising.

DETAILED DESCRIPTION

The present invention will be further described with the following examples below. It should be understood that the following examples are only used for explaining this invention, and do not limit this invention.

The present application proposes to use silicon nitride ceramic as a mobile phone rear cover material, by making use of excellent mechanical properties of the silicon nitride ceramic, especially high toughness and other properties, to meet the required mechanical properties of the ceramic mobile phone rear cover. The toughness of silicon nitride ceramic can be improved to more than 12 MPa·m$^{1/2}$ by means of optimizing the formula, process and sintering system in the preparation of the ceramic. Meanwhile, the color adjustment of silicon nitride ceramic can be realized in the way of adding a colorant or coloring with a sintering aid. In addition, samples of silicon nitride ceramic mobile phone rear covers can be prepared by injection molding, dry pressing, or tape casting. The silicon nitride mobile phone rear cover material proposed by the application is beneficial to signal reception and heat dissipation, and has abundant colors. Not only that, the preparation process of silicon nitride mobile phone rear cover material is simple and reliable, easy to operate, and has a preparation cost comparable to that of zirconia. The specific implementation of the present application is further explained as follows.

A first aspect of the application provides a method for preparing a silicon nitride ceramic. The method comprises: taking a mixture containing a silicon source, a colorant, and a sintering aid as raw materials, mixing each component of the raw materials, followed by shaping and sintering to obtain a silicon nitride ceramic.

Silicon nitride ceramic is a kind of traditionally structural ceramics. Based on long-term research and accumulation, the application proposes that silicon nitride ceramic has advantages of high strength, high toughness, excellent impact resistance and thermal shock resistance, as well as high thermal conductivity, good microwave transmission, good mechanical property and high temperature performance. In brief, the excellent properties of silicon nitride ceramic make it particularly suitable for preparing the mobile phone rear cover. On this basis, the application adopts silicon nitride ceramic as the material of mobile phone rear cover. Compared with zirconia, silicon nitride ceramic has the advantages mentioned above, and is more excellent and more potential as the mobile phone rear cover material.

In some examples, the mass ratio of a silicon source, a colorant, and a sintering aid is (85 to 96.5):(5 to 0.5):(10 to 3), such as (85 to 96.5):(5, 4, 3, 2, 1, or 0.5):(10, 9, 8, 7, 6, 5, 4, or 3), wherein the mass of silicon source is converted into that of silicon nitride for calculation. Keeping the mass ratio of a silicon source, a colorant and a sintering aid in the above range can ensure that obtained silicon nitride ceramic has a high density, thus having good effects on mechanical properties, and at the same time can ensure the obtained silicon nitride ceramic has a uniform color distribution.

In the preparation method of silicon nitride ceramic proposed by the present application, for example, the preparation method of silicon nitride ceramic for the mobile phone rear cover, the silicon nitride ceramic can be prepared by adding a colorant and a sintering aid to a silicon nitride powder, or can be prepared by adding a colorant and a sintering aid after the nitridation of a silicon powder. Thus, in other examples, the silicon source is a silicon nitride powder and/or a silicon powder. The silicon nitride ceramic of the application can be directly prepared by using a silicon nitride powder. Preferably, the particle size of the silicon nitride powder ranges from 0.5 μm to 20 μm, such as 0.5 μm, 1.0 μm, 5.0 μm, 10.0 μm, 15.0 μm, or 20.0 μm. The particle size of silicon nitride powder within the above range is helpful to prepare a dense silicon nitride ceramic. The silicon nitride ceramic of the application can also be prepared by sintering after nitridation of a silicon powder. Preferably, the particle size of the silicon powder ranges from 0.2 μm to 30 μm, for example, 0.2 μm, 0.5 μm, 1.0 μm, 5.0 μm, 10.0 μm, 15.0 μm, 20.0 μm, 25.0 μm, or 30.0 μm. The silicon powder with a particle size within the above range, can be completely nitrided, so as to obtain a dense silicon nitride ceramic through later sintering.

In some preferred examples, the colorant is selected from a group consisting of colorants (i) to (iv) as follows: (i) a metallic element, which is preferably selected from a group consisting of Fe, V, Pb, Co, Cr, Mn, Ni, Cu, and Hf. (ii) an oxide, carbide and nitride of a transition metal and a solid solution thereof; preferably, the transition metal is selected from a group consisting of Ti, Zr, and Hf; in addition, the solid solution is preferably selected from a group consisting of $TiN_{(1-x)}C_x$, $ZrN_{(1-x)}C_x$, and $HfN_{(1-x)}C_x$, wherein x is greater than zero and less than 1 (0<x<1), such as 0.1, 0.2, 0.5, 0.8, or 0.9. (iii) one or more of Cl$^-$ ions (ionic chlorine), C, and SiC. (iv) oxide, carbide and nitride of rare earth metal and precursor thereof (such as carbonate, nitrate, acetate of rare earth metal, etc., or organic compound of rare earth metal, etc.); preferably, the rare earth metal is selected from a group consisting of Scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu); more preferably, the rare earth metal is selected from a group consisting of yttrium (Y), erbium (Er), and europium (Eu); further preferably, it is particularly advantageous that the colorant is added in the form of one or more of carbonate, nitrate and acetate of the rare earth metal, since carbonate, nitrate or acetate of the rare earth metal can form oxide of a corresponding rare earth metal without any impurities remained during sintering. Moreover, the colorant selected by the application also has a function of a sintering aid.

In some preferred examples, the sintering aid is selected from a group consisting of a first sintering aid and a second sintering aid; the first sintering aid is selected from a group consisting of $Al_2O_3$, AlN, CaO, MgO, and $SiO_2$; the second sintering aid is selected from a group consisting of $Y_2O_3$ and lanthanide rare earth oxide. For example, the lanthanide metal can be yttrium (Y), erbium (Er), or europium (Eu). It is preferred that the sintering aid comprises at least one first sintering aid and at least one second sintering aid. The sintering of silicon nitride belongs to the category of liquid phase sintering. The sintering temperature can be further reduced and the sintering process can be further accelerated when using both kinds of sintering aids at the same time. Further preferably, the mass ratio of the first sintering aid and the second sintering aid is 3:(5 to 8), such as 3:(5, 6, 7 or 8).

In some preferred examples, the method for preparing a silicon nitride ceramic comprises the following steps: (1) dispersing a silicon source, a colorant and a sintering aid in an organic solvent to obtain a mixture of raw materials; (2) adding a dispersant to the mixture of raw materials and mixing uniformly to obtain a mixture to be shaped; and (3) forming the mixture to be shaped into a green body, and then sintering the green body to give a silicon nitride ceramic.

In some preferred examples, the method also comprises a step of adding a binder and/or a plasticizer and mixing evenly to obtain a mixture to be shaped (i.e., a slurry) after adding a dispersant to the mixture of raw materials and mixing uniformly.

In some preferred examples, the organic solvent is selected from a group consisting of ethanol, butanone, toluene, n-hexane, methanol, xylene, n-propanol, and n-butanol; preferably, the organic solvent is a binary mixed solvent of ethanol/butanone, ethanol/toluene, ethanol/n-hexane, butanone/methanol, xylene/n-propanol, and xylene/n-butanol with a mass ratio of 1:(0.2 to 8) (such as 1:(0.5, 1, 2, 5 or 8)). The inventors found that the wettability, solubility, and solvent volatilization rate of slurry can be adjusted simultaneously by using the binary mixed solvent, thus providing a more effective slurry than using a single solvent. More preferably, the addition amount of the organic solvent is 14% to 50% (for example 15%, 20%, 25%, 30%, 35%, 40%, 45%, or 50%) of the total mass of the silicon nitride powder, the colorant and the sintering aid. If the addition amount of the organic solvent is too small, it is difficult to achieve a homogeneous mixing of the silicon nitride powder, the colorant and the sintering aid; if the addition amount of the organic solvent is too large, excess solvent does not have any extra help to the mixing effect, and leads to an increase in the cost of solvent.

In some preferred examples, the dispersant is selected from a group consisting of glycerol trioleate, phosphate, castor oil, herring oil, ascorbic acid, and terpineol. Preferably, the addition amount of the dispersant is 0.5% to 4% (for example, 0.5%, 1.0%, 1.5%, 2.0%, 2.5%, 3.0%, 3.5%, or 4.0%) of the total mass of the silicon nitride powder, the colorant and the sintering aid. If the addition amount of the dispersant is too small, the role of the dispersant cannot not be brought into full play; if the addition amount of the dispersant is too large, the dispersion effect of the mixture to be shaped becomes worse.

In some preferred examples, the binder is polyvinyl butyral (PVB) and/or polymethylmethacrylate (PMMA). Preferably, the addition amount of the binder is 0.5% to 10% (such as 0.5%, 1.0%, 2.0%, 5.0%, or 10.0%) of the silicon nitride powder, the colorant and the sintering aid. If the addition amount of the binder is too large, excess binder results in a slurry with excessive viscosity, making the mixing of slurry not easy to operate and the uniformity of slurry becoming worse, which is unfavorable to the adjustment of mechanical properties and colors of silicon nitride ceramic; if the addition amount of the binder is too small, the green body formed by tape casting may occur some defects such as cracking.

In some preferred examples, the plasticizer is dibutyl phthalate (DBP) and/or butyl benzyl phthalate (BBP). Preferably, the addition amount of the plasticizer is 0.5 to 10% (such as 0.5%, 1.0%, 2.0%, 5.0%, or 10.0%) of the total mass of the silicon source powder, the colorant and the sintering aid. If the addition amount of the plasticizer is too large, too thin slurry may be unfavorable for subsequent sintering; if the addition amount of the plasticizer is too small, cast film prepared may has poor plasticity and defects such as cracking.

In some preferred examples, the forming may be achieved by injection molding, dry pressing, or tape casting. However, the forming methods adopted in the present application are not limited to the above forming methods. In a preferred example, the material to be shaped is formed into a green body through tape casting. For example, the material to be shaped can be cast into a plate with a target thickness as required, such as a cast film with a thickness of 0.4 mm to 0.6 mm.

In some preferred examples, the sintering is realized by pressureless sintering, gas pressure sintering or high temperature isostatic pressing sintering. Preferably, the sintering temperature is 1,600° C. to 1,950° C. (such as, 1,600° C., 1,700° C., 1,800° C., or 1,900° C.), the sintering time is 1 hour to 12 hours (such as, 1 hour, 2 hours, 5 hours, 8 hours, 10 hours, or 12 hours), and the sintering pressure is 0.1 MPa to 10 MPa (such as, 0.1 MPa, 0.5 MPa, 1.0 MPa, 2.0 MPa, 5.0 MPa or 10.0 MPa). More preferably, the heating rate is 1° C./min to 10° C./min (such as, 1° C./min, 2° C./min, 5° C./min, or 10° C./min) during the heating stage of sintering process.

There is no special restriction on the mixed approach after adding a dispersant and the mixed approach after adding a binder and/or a plasticizer, as long as each component of raw materials and other supplementary components such as the dispersant, plasticizer and binder can be mixed evenly. For example, the mixing after adding a dispersant and the mixing after adding a binder and/or plasticizer may be respectively carried out by ball milling.

In some preferred examples, the silicon source is a silicon powder, and the method for preparing a silicon nitride ceramic comprises a step of nitriding the silicon powder. Preferably, the nitriding temperature is 1,300° C. to 1,500° C. (for example, 1,350° C., 1,400° C., 1,450° C., or 1,500° C.) and the nitriding time is 6 hours to 10 hours (such as 6 hours, 7 hours, 8 hours, 9 hours, or 10 hours). Nitrogen or a mixture of nitrogen and hydrogen (a volume ratio of $N_2$ and H$_2$ is (90 to 95):(10 to 5)) can be used as a nitriding atmosphere during nitridation. Wherein, nitrogen not only can be used as a nitrogen source, but also can effectively inhibit the decomposition of Si$_3$N$_4$, which is favorable for the synthesis of compact sintered body at high temperature.

In some preferred examples, the method for preparing a silicon nitride ceramic also comprises a step of defoaming the material to be shaped before forming.

Further, in step (3), the green body can be formed into a plate, preferably a mobile phone rear cover.

A second aspect of the application provides a silicon nitride ceramic prepared by the method described in the first aspect of the present application.

In some preferred examples, the silicon nitride ceramic has at least one of the following characteristics: (1) a density of 3.2 to 3.4 g/cm$^3$; (2) a toughness of more than 12 MPa·m$^{1/2}$, such as 12 to 15 MPa·m$^{1/2}$; (3) a strength of 500 MPa to 1,100 MPa, such as 500, 600 MPa, 700 MPa, 800 MPa, 900 MPa, 1,000 MPa, or 1,100 MPa; (4) a thermal conductivity of 40 W/m·K to 70 w/m·K, such as 60 W/m·K; (5) a dielectric constant of 7.4 to 9.4, such as 7.5, 8.0 or 8.5; (6) a dielectric loss of 10×10$^{-4}$ to 15×10$^{-4}$, such as 11×10$^{-4}$, 12×10$^{-4}$, 13×10$^{-4}$, 14×10$^{-4}$, or 15×10$^{-4}$; (7) a relative density of 95.0% to 99.5%. More preferably, the silicon nitride ceramic simultaneously has the above characteristics (2), (4), (5), and (6). Further preferably, the silicon nitride ceramic simultaneously has the above characteristics (1) to (7). These characteristics make silicon nitride ceramic particularly suitable as the mobile phone rear cover material.

A third aspect of the application provides an application of silicon nitride ceramic as the mobile phone rear cover material. In some preferred examples, the silicon nitride ceramic is prepared by the method described in the first aspect of the application, or the silicon nitride ceramic of the second aspect of the application. According to the application, it can be certainly understood that the silicon nitride ceramic has properties required by the mobile phone rear cover material. The silicon nitride ceramic of the present application can also be applied to other applications where the material performance meets the requirements, for example, a material for the case of a communication device, especially a microwave window material.

The application proposes that silicon nitride ceramic as a novel mobile phone rear cover material, has equally excellent mechanical performance as zirconia ceramic, moreover, has advantages of good texture, light weight and more sensitive signals, and is a new kind of mobile phone rear cover material with great potential.

A fourth aspect of the application provides a mobile phone rear cover, which is made of the silicon nitride ceramic described in the application; preferably, the mobile phone rear cover is made of a silicon nitride ceramic prepared by the method in the first aspect of the application.

The silicon nitride mobile phone rear cover made of silicon nitride ceramic proposed by the application has the following characteristics: first of all, silicon nitride ceramic has a higher impact toughness, is not easy to break, and is not easily damaged during machining, thus providing a high rate of finished products; secondly, silicon nitride ceramics has a high thermal conductivity, which is more than 10 times that of zirconia ceramics and beneficial to dissipating heat; therefore, when the mobile phone is running at a high speed or the battery is charging and discharging, the heat generated is easy to be dissipated, which is conducive to the normal operation of the mobile phone and the avoidance of system crashes, slow operation, and other phenomena; in addition, silicon nitride ceramic has a dielectric loss of two orders of magnitude lower than that of zirconia, is more transparent to mobile phone signals, and easier to communicate in a weak signal environment; besides, silicon nitride ceramic has a higher hardness, a lower density than zirconia, and a preparation cost close to zirconia; moreover, silicon nitride ceramic belongs to colorless ceramics, has a relatively easy coloring process and a better coloring effect. Therefore, compared with zirconia ceramic, the development of silicon nitride ceramic for mobile phones has obvious advantages.

In conclusion, compared with commonly used zirconia mobile phone rear cover at present, silicon nitride mobile phone rear cover has a higher impact toughness, a more safe and reliable applicability, a high thermal conductivity, and a faster heat dissipation which can guarantee the mobile phone to run at high speed and system not being crashed, and also guarantee the service life and stability of the mobile phone and the battery. And not only that, silicon nitride ceramic is more transparent to microwaves, maintains unobstructed communication in a weak signal environment, has a lighter density and a preparation cost close to zirconia. Silicon nitride is transparent colorless, easy-to-color, has a texture similar to jade, and is a new type of ceramic material for mobile phones with great potential, in particular a mobile phone rear cover material. Besides, silicon nitride has been used as structural ceramic for a long time in harsh environments such as automobile engines, which fully proves its application stability and reliability.

Hereinafter, the following representative examples are further cited below to illustrate the present invention in detail. It should be understood that the following examples are used to explain this invention and do not limit the scope of this invention. Any non-essential improvements and modifications made by a person skilled in the art based on this invention shall belong to the protection scope of this invention. The specific technological parameters in following examples are only exemplary, and a person skilled in the art can choose proper values within an appropriate range according to the description, and are not defined to the specific parameters cited below. Unless otherwise specified herein, the particle size of a silicon nitride powder in the following examples is 0.2 to 20 μm, and that of a sintering aid (a system of sintering aids) is 0.5 to 10 μm.

Example 1

Figure 1:
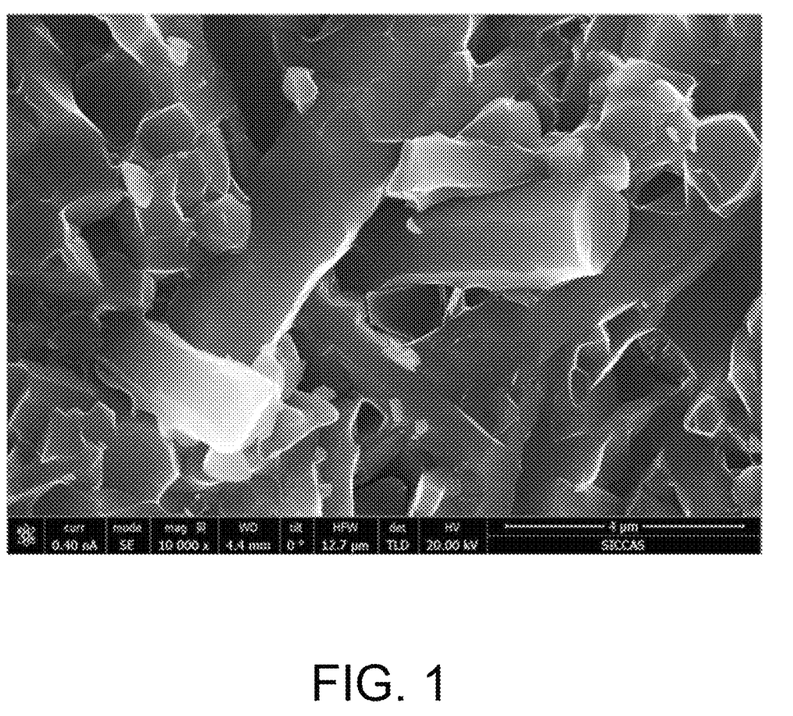
FIG. 1 is a cross-sectional scanning electron microscope image of a silicon nitride ceramic obtained from Example 1.

160 g of a silicon nitride powder, 2 g of chromic oxide as a colorant, and 15 g of sintering aids consisting of alumina and yttrium oxide (mass ratio of alumina and yttrium oxide was 3:5) were added into 38 g of ethanol-butanone solvent system (mass ratio of ethanol and butanone was 34:66). 3.5 g of glycerol trioleate was subsequently added as a dispersant and ball milling was performed at 380 revolutions per minute for 12 hours. Then 16 g of PVB (polyvinyl butyral) as a binder and 16 g of DBP (dibutyl phthalate) as a plasticizer were added, and ball milling was performed at 200 revolutions per minute for 36 hours to give a mixture to be shaped. The mixture to be shaped was defoamed and cast into a film with a thickness of 0.6 mm, followed by subjecting a binder removal to the cast film. The cast film was then heated to 1,750° C. at a heating rate of 5° C./min in a carbon tube furnace under a nitrogen atmosphere and sintered at 1,750° C. for 2 hours, so as to obtain a compact and integrated silicon nitride ceramic rear cover. FIG. 1 shows a microstructure (a cross-sectional scanning electron microscope image) of the silicon nitride ceramic prepared by Example 1. It can be seen from FIG. 1 that the sintered silicon nitride ceramic has a compact microstructure and a large number of rodlike crystals is generated therein. Therefore, the obtained silicon nitride ceramic has a high strength and a high toughness, and is suitable for the application as a mobile phone rear cover material.

Example 2

96 g of a silicon powder, 2 g of chromic oxide as a colorant, and 15 g of sintering aids consisting of alumina and yttrium oxide (mass ratio of alumina and yttrium oxide was 3:5) were added into 38 g of ethanol-butanone solvent system (mass ratio of ethanol and butanone was 34:66). 3.5 g of glycerol trioleate was subsequently added as a dispersant and ball milling was performed at 380 revolutions per minute for 12 hours. Then 16 g of PVB (polyvinyl butyral) as a binder and 16 g of DBP (dibutyl phthalate) as a plasticizer were added, and ball milling was performed at 200 revolutions per minute for 36 hours to give a mixture to be shaped. The mixture to be shaped was defoamed and cast into a film with a thickness of 0.6 mm, followed by subjecting a binder removal to the cast film. Then the cast film was nitrided in a carbon tube furnace at 1,400° C. for 8 hours for nitridation. After that, the cast film was heated to 1,750° C. at a heating rate of 5° C./min in the carbon tube furnace and sintered at 1,750° C. for 2 hours, so as to obtain a compact and integrated silicon nitride ceramic rear cover.

Example 3

160 g of a silicon nitride powder and 16 g of sintering aids consisting of alumina and erbium oxide (mass ratio of alumina and erbium oxide was 3:6) were added into 38 g of ethanol-butanone solvent system (mass ratio of ethanol and butanone was 34:66). 3.5 g of glycerol trioleate was subsequently added as a dispersant and ball milling was performed at 380 revolutions per minute for 12 hours. Then 16 g of PVB (polyvinyl butyral) as a binder and 16 g of DBP (dibutyl phthalate) as a plasticizer were added, and ball milling was performed at 200 revolutions per minute for 24 hours to give a mixture to be shaped. The mixture to be shaped was defoamed and cast into a film with a thickness of 0.6 mm, followed by subjecting a binder removal to the cast film. Then the cast film was heated to 1,780° C. at a heating rate of 5° C./min in a carbon tube furnace and sintered at 1,780° C. for 6 hours, so as to obtain a compact and integrated silicon nitride ceramic rear cover.

Example 4

96 g of a silicon powder and 16 g of sintering aids consisting of alumina and erbium oxide (mass ratio of alumina and erbium oxide was 3:6) were added into 38 g of ethanol-butanone solvent system (mass ratio of ethanol and butanone was 34:66). 3.5 g of glycerol trioleate was subsequently added as a dispersant and ball milling was performed at 380 revolutions per minute for 12 hours. Then 16 g of PVB (polyvinyl butyral) as a binder and 16 g of DBP (dibutyl phthalate) as a plasticizer were added, and ball milling was performed at 200 revolutions per minute for 48 hours to give a mixture to be shaped. The mixture to be shaped was defoamed and cast into a film with a thickness of 0.6 mm, followed by subjecting a binder removal to the cast film. Then the cast film was nitrided in a carbon tube furnace at 1,400° C. for 8 hours for nitridation. Afterward, the cast film was heated to 1,780° C. at a heating rate of 5° C./min in the carbon tube furnace and sintered at 1,780° C. for 8 hours, so as to obtain a compact and integrated silicon nitride ceramic rear cover.

Example 5

160 g of a silicon nitride powder and 15 g of sintering aids consisting of alumina and europium oxide (mass ratio of alumina and europium oxide was 2:5) were added into 38 g of ethanol-butanone solvent system (mass ratio of ethanol and butanone was 34:66). 3.5 g of glycerol trioleate was subsequently added as a dispersant and ball milling was performed at 380 revolutions per minute for 12 hours. Then 16 g of PVB (polyvinyl butyral) as a binder and 16 g of DBP (dibutyl phthalate) as a plasticizer were added, and ball milling was performed at 200 revolutions per minute for 36 hours to give a mixture to be shaped. The mixture to be shaped was defoamed and cast into a film with a thickness of 0.6 mm, followed by subjecting a binder removal to the cast film. The cast film was then heated to 1,900° C. at a heating rate of 5° C./min in a carbon tube furnace and sintered at 1,900° C. for 5 hours, so as to obtain a compact and integrated silicon nitride ceramic rear cover. During the sintering process, the sintering pressure was 0.6 MPa and the sintering atmosphere was a mixture of nitrogen and hydrogen with a volume ratio of 95:5.

Example 6

160 g of a silicon nitride powder and 15 g of sintering aids consisting of alumina and europium oxide (mass ratio of alumina and europium oxide was 2:5) were added into 38 g of n-hexane. 3.5 g of terpineol was subsequently added as a dispersant and ball milling was performed at 380 revolutions per minute for 12 hours. Then 16 g of polymethylmethacrylate as a binder and 16 g of butyl benzyl phthalate (BBP) as a plasticizer were added, and ball milling was performed at 200 revolutions per minute for 36 hours to give a mixture to be shaped. The mixture to be shaped was defoamed and cast into a film with a thickness of 0.6 mm, followed by subjecting a binder removal to the cast film. The cast film was then heated to 1,900° C. at a heating rate of 5° C./min in a carbon tube furnace and sintered at 1,900° C. for 5 hours, so as to obtain a compact and integrated silicon nitride ceramic rear cover. During the sintering process, the sintering pressure was 0.6 MPa and the sintering atmosphere was nitrogen.

Example 7

160 g of a silicon nitride powder, 2 g of hafnium oxide as a colorant and 15 g of sintering aids consisting of alumina and yttrium oxide (mass ratio of alumina and yttrium oxide was 3:5) were added into 38 g of ethanol-butanone solvent system (mass ratio of ethanol and butanone was 34:66). 3.5 g of glycerol trioleate was subsequently added as a dispersant and ball milling was performed at 380 revolutions per minute for 12 hours. Then 16 g of PVB (polyvinyl butyral) as a binder and 16 g of DBP (dibutyl phthalate) as a plasticizer were added, and ball milling was performed at 200 revolutions per minute for 36 hours to give a mixture to be shaped. The mixture to be shaped was defoamed and cast into a film with a thickness of 0.6 mm, followed by subjecting a binder removal to the cast film. The cast film was then heated to 1,600° C. at a heating rate of 5° C./min in a carbon tube furnace and sintered at 1,600° C. for 12 hours under a nitrogen atmosphere and a nitrogen pressure of 9 MPa, so as to obtain a compact and integrated silicon nitride ceramic rear cover.

Example 8

160 g of a silicon nitride powder, 2 g of chromic oxide as a colorant and 15 g of sintering aids consisting of alumina and yttrium oxide (mass ratio of alumina and yttrium oxide was 3:5) were added into 38 g of ethanol-butanone solvent system (mass ratio of ethanol and butanone was 34:66). 3.5 g of glycerol trioleate was subsequently added as a dispersant and ball milling was performed at 380 revolutions per minute for 12 hours to give a slurry. The slurry was poured out and dried in an oven at 80° C. for 24 hours to form a ceramic powder and then the ceramic powder was passed through a 100 mesh sieve. An appropriate amount of sieved powder was placed in a mold for prepressing and forming. A molded sample was subjected to isostatic cold pressing at a pressure of 200 MPa for 2 minutes to give a green body, followed by subjecting a binder removal to the green body. The green body was heated to 1,750° C. at a heating rate of 5° C./min in a carbon tube furnace and sintered at 1,750° C. for 2 hours, so as to obtain a compact and integrated silicon nitride ceramic rear cover.

Example 9

200 g of a zirconia powder, 1 g of chromic oxide as a colorant and 6 g of yttrium oxide as a sintering aid were added into 38 g of ethanol-butanone solvent system (mass ratio of ethanol and butanone was 34:66). 3.5 g of glycerol trioleate was subsequently added as a dispersant and ball milling was performed at 380 revolutions per minute for 12 hours. Then 15 g of PVB (polyvinyl butyral) as a binder and 15 g of DBP (dibutyl phthalate) as a plasticizer were added, and ball milling was performed at 200 revolutions per minute for 36 hours to give a mixture to be shaped. The mixture to be shaped was defoamed and cast into a film with a thickness of 0.6 mm, followed by subjecting a binder removal to the green body. Then the cast film was heated to 1,600° C. at a heating rate of 5° C./min in a muffle furnace and sintered at 1,600° C. for 2 hours, so as to obtain a compact and integrated zirconia ceramic rear cover.

Table 1 shows the species and amounts of raw materials used in each example.

Table 2 shows process conditions used in each example.

Table 3 shows performances of materials obtained from each example.

Figure 2:
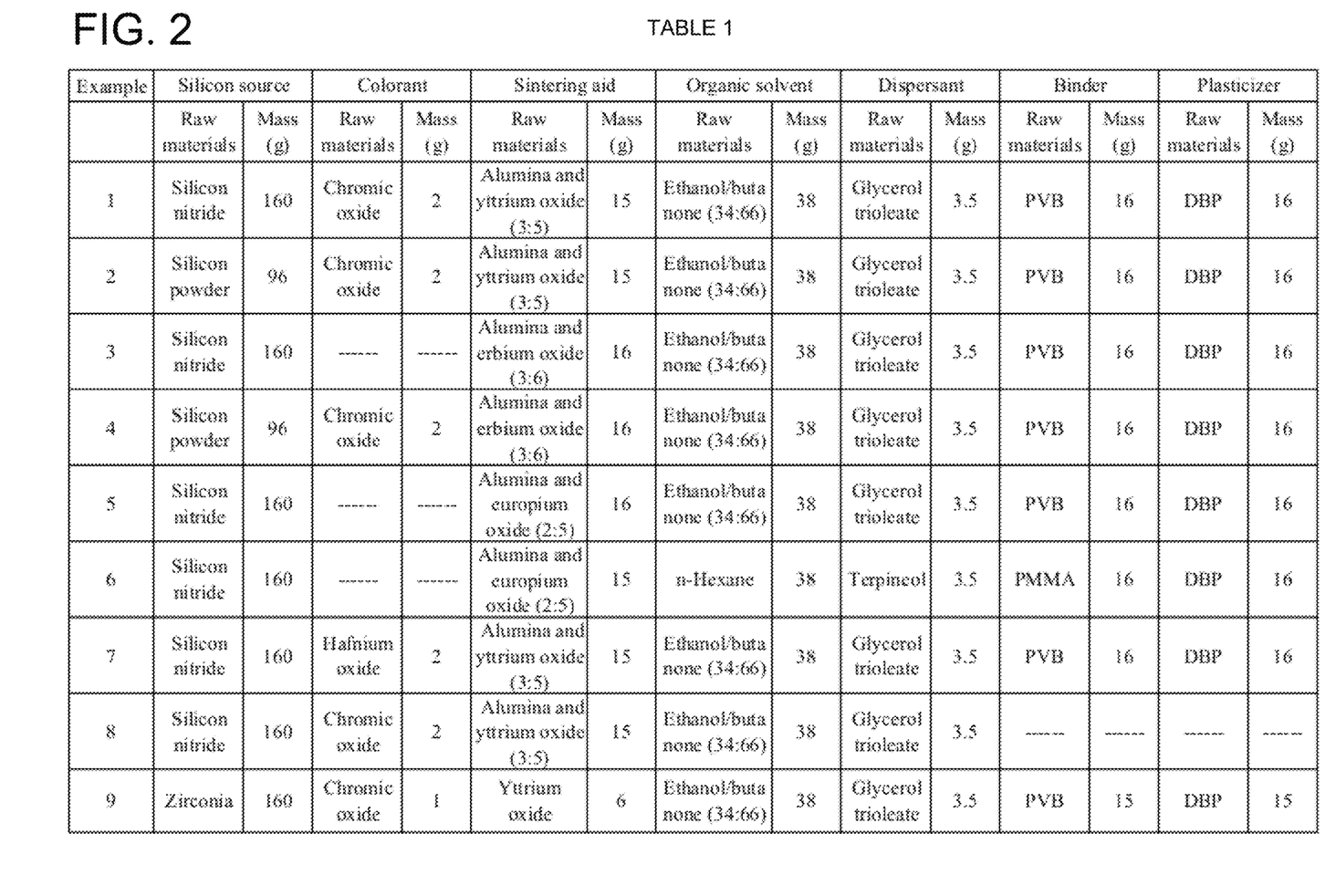
FIG. 2 is an image of Table 1, and shows the species and amounts of raw materials used in each example.
Figure 3:
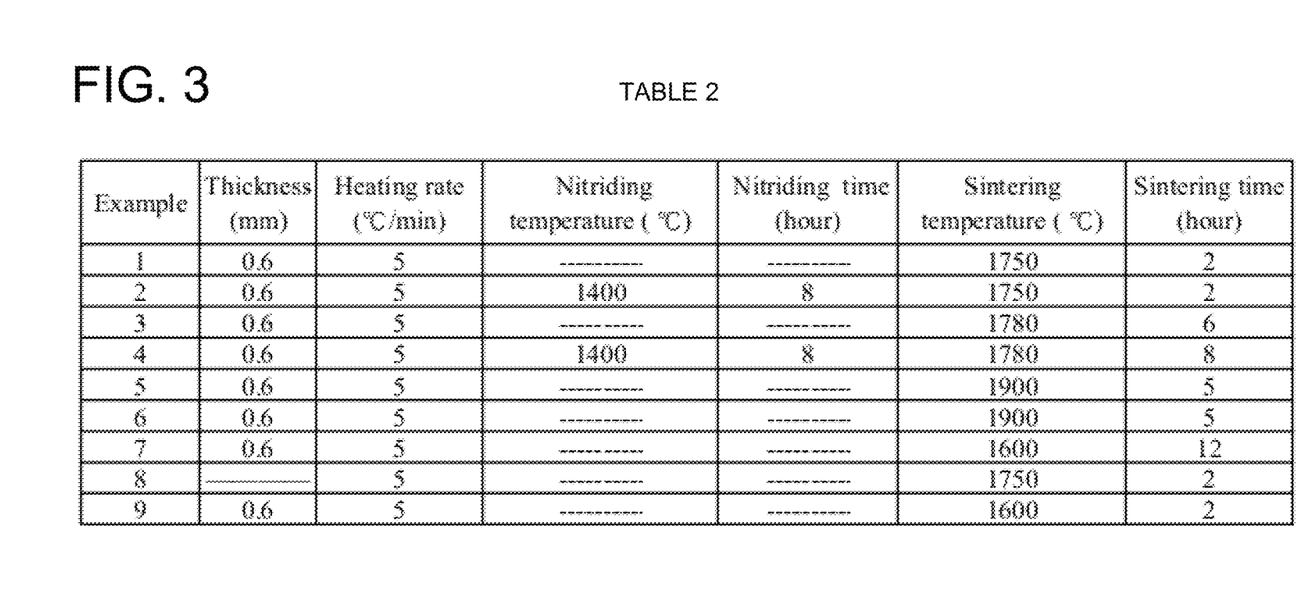
FIG. 3 is an image of Table 2, and shows process conditions used in each example.
Figure 4:
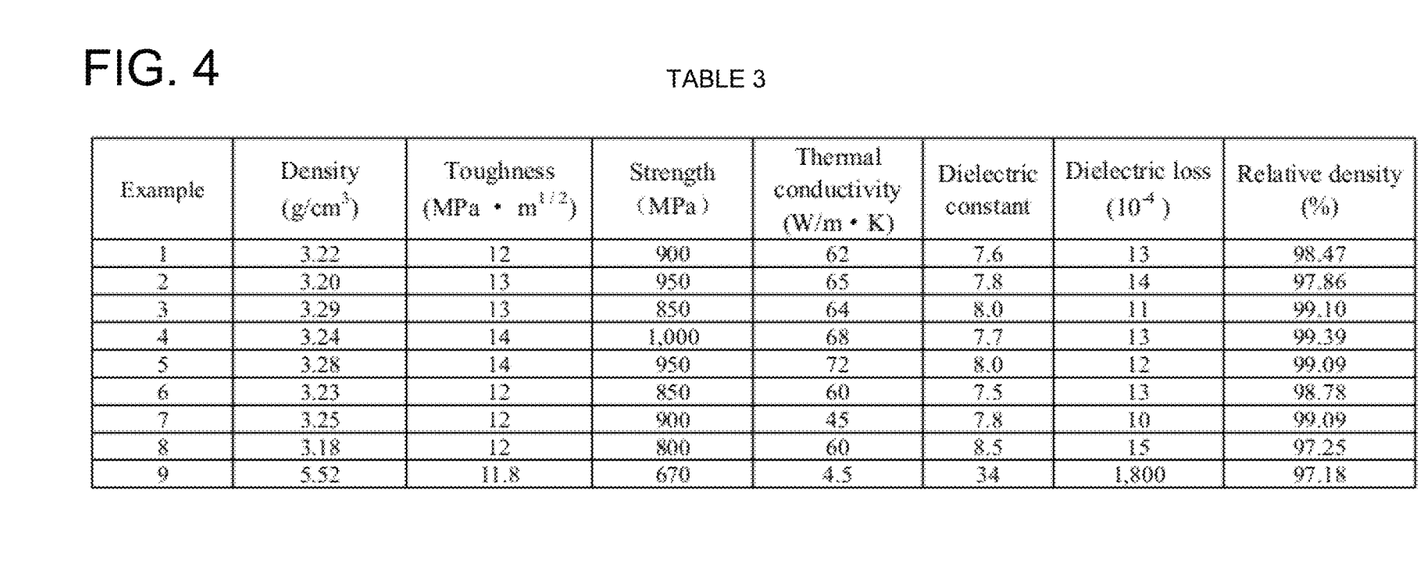
FIG. 4 is an image of Table 3, and shows performances of materials obtained from each example.

As can be seen from Tables 1 to 3 (as shown in FIGS. 2 to 4), the silicon nitride ceramic prepared by the present application has the following characteristics: a density of 3.2 to 3.4 g/cm$^3$; a toughness which can reach more than 12 MPa·m$^{1/2}$ (single side notch beam method); a strength of 800 MPa to 1,100 MPa (from three-point bending strength test), a thermal conductivity of 40 W/m·K to 70 W/m·K (though laser flash method), a dielectric constant of 7.4 to 9.4 (though resonant-cavity method), a dielectric loss of $10\times10^{-4}$ to $15\times10^{-4}$ (though resonant-cavity method), and a relative density of 95.0% to 99.5% (though Archimedes method). Therefore, the silicon nitride ceramic prepared by the method of the application is particularly suitable as a mobile phone rear cover material.

Finally, it should be noted that the above examples are only used to describe the technical proposal of the application and not to restrict the protection scope thereof. Although the present application has been described in detail with the foregoing examples, a person skilled in the art shall understand that the technical solutions recorded in the above-mentioned examples may be modified, or part of the technical features therein may be substituted equivalently, while the modifications or substitutions may not make the essence of the corresponding technical solutions deviate from the spirit and scope of the technical solutions of the examples of the application.

The invention claimed is:

1. A preparation method of silicon nitride ceramic for a mobile phone rear cover, comprising:
    (1) dispersing a mixture containing a silicon source, an oxide of a transition metal, a first sintering aid and an oxide of rare earth metal in an organic solvent to obtain a mixture of raw materials;
    (2) adding a dispersant to the mixture of raw materials and then adding a binder and/or a plasticizer and mixing evenly to obtain a mixture to be shaped; and
    (3) shaping the mixture to be shaped into a green body, and sintering the green body to obtain the silicon nitride ceramic,
    wherein the oxide of the transition metal is chromic oxide or hafnium oxide and serves as a first colorant,
    wherein the first sintering aid is selected from the group consisting of $Al_2O_3$, AlN, CaO, MgO, and $SiO_2$,
    wherein the oxide of the rare earth metal is selected from the group consisting of yttrium oxide, europium oxide, and erbium oxide and serves both as a second sintering aid and a second colorant,
    wherein a mass ratio of the first sintering aid and the second sintering aid is 3:(5 to 8),
    wherein the silicon source is a silicon nitride powder and/or a silicon powder, and the mass ratio of the silicon source, the first colorant, and the mixture of the first and the second sintering aid is 160:2:15, and the mass of the silicon source is converted into that of silicon nitride for calculation, and
    wherein the silicon nitride ceramic has the following characteristics:
        a density of 3.2 to 3.4 g/cm$^3$;
        a toughness of more than 12 MPa·m$^{1/2}$;
        a strength of 500 MPa to 1,100 MPa;
        a thermal conductivity of 40 W/m·K to 70 w/m·K;
        a dielectric constant of 7.4 to 9.4;
        a dielectric loss of $10\times10^{-4}$ to $15\times10^{-4}$; and
        a relative density of 95.0% to 99.5%.

2. The preparation method of claim 1, wherein
    the particle size of the silicon nitride powder ranges from 0.5 μm to 20 μm, and/or the particle size of the silicon powder ranges from 0.2 μm to 30 μm.

3. The preparation method of claim 1, wherein
    the organic solvent is selected from the group consisting of ethanol, butanone, toluene, n-hexane, methanol, xylene, n-propanol, and n-butanol,
    an addition amount of the organic solvent is 14% to 50% of the total mass of the silicon source, the first colorant, and the sintering aid,
    the dispersant is selected from the group consisting of glycerol trioleate, phosphate, castor oil, herring oil, ascorbic acid, and terpineol, and
    an addition amount of the dispersant is 0.5% to 4% of the total mass of the silicon source, the first colorant, and the sintering aid.

4. The preparation method of claim 1, wherein
the binder is polyvinyl butyral and/or polymethylmethacrylate, and an addition amount of the binder is 0.5% to 10% of the silicon source, the first colorant, and the sintering aid; and/or
the plasticizer is dibutyl phthalate and/or butyl benzyl phthalate, and an addition amount of the plasticizer is 0.5 to 10% of the total mass of the silicon source, the first colorant, and the sintering aid.

5. The preparation method of claim 3, wherein the organic solvent is a binary mixed solvent of ethanol/butanone, ethanol/toluene, ethanol/n-hexane, butanone/methanol, xylene/n-propanol, or xylene/n-butanol, with a mass ratio of 1:(0.2 to 8).

6. The preparation method of claim 1, wherein
the shaping is injection molding, dry pressing, or tape casting,
the sintering is pressureless sintering, gas pressure sintering, or high temperature isostatic pressing sintering, the sintering temperature is 1,600° C. to 1,950° C., the sintering time is 1 hour to 12 hours, the sintering pressure is 0.1 MPa to 10 MPa, and the heating rate is 1° C./min to 10° C./min during a heating stage of the sintering, and/or
the mixing in step (2) and/or step (3) is performed by ball milling.

7. The preparation method of claim 1, wherein
the silicon source is the silicon powder, and
the preparation method further comprises a step of nitriding the silicon powder, the nitriding temperature being 1,300° C. to 1,500° C., the nitriding time being 6 hours to 10 hours, and a nitrogen source for nitridation being nitrogen or a mixture of nitrogen and hydrogen with a volume ratio of (90 to 95):(10 to 5).

8. The preparation method of claim 1, wherein
the preparation method further comprises a step of defoaming the material to be shaped before forming; and/or
the green body is formed into a mobile phone rear cover in step (3).

* * * * *